(12) United States Patent
Murakami (10) Patent No.: US 9,845,131 B2
(45) Date of Patent: Dec. 19, 2017

(54) FRONT FORK (71) Applicant: Showa Corporation, Gyoda-shi (JP)

(72) Inventor: Yosuke Murakami, Fukuroi (JP)

(73) Assignee: SHOWA CORPORATION, Gyoda-Shi (JP)

(*) Notice: Subject to any disclaimer, the term of this patent is extended or adjusted under 35 U.S.C. 154(b) by 0 days.

(21) Appl. No.: 15/069,074

(22) Filed: Mar. 14, 2016

(65) Prior Publication Data

US 2016/0280315 A1 Sep. 29, 2016

(30) Foreign Application Priority Data

Mar. 27, 2015 (JP) ................. 2015-066201

(51) Int. Cl.
| | |
|---|---|
| B62K 25/08 | (2006.01) |
| F16F 9/48 | (2006.01) |
| B62K 25/28 | (2006.01) |
| F16F 9/32 | (2006.01) |
| B62K 21/02 | (2006.01) |
| F16F 13/00 | (2006.01) |
| B62K 25/04 | (2006.01) |

(52) U.S. Cl.
CPC .............. *B62K 25/08* (2013.01); *B62K 21/02* (2013.01); *B62K 25/283* (2013.01); *F16F 9/3292* (2013.01); *F16F 9/48* (2013.01); *B62K 2025/044* (2013.01); *B62K 2207/00* (2013.01); *F16F 13/007* (2013.01)

(58) Field of Classification Search
CPC .. B62K 25/08; B62K 21/02; B62K 2025/044; B62K 2207/00; F16F 9/3292; F16F 9/48; F16F 9/49; F16F 13/007; B60G 17/0152; B60G 17/019; B60G 17/015
See application file for complete search history.

(56) References Cited

U.S. PATENT DOCUMENTS

| | | | |
|---|---|---|---|
| 2003/0075403 A1* | 4/2003 | Dernebo | F15B 15/1466 188/284 |
| 2011/0005387 A1 | 1/2011 | Ehre et al. | |
| 2014/0319789 A1* | 10/2014 | Murakami | B60G 17/0152 280/5.514 |

FOREIGN PATENT DOCUMENTS

| | | |
|---|---|---|
| DE | 10 2006 006286 A | 8/2006 |
| EP | 1878648 A | 1/2008 |
| EP | 2796357 A | 10/2014 |
| JP | 06-263078 A | 9/1994 |
| WO | WO-2014/134500 A | 9/2014 |

OTHER PUBLICATIONS

Extended European Search Report dated Aug. 17, 2016 for the corresponding European Patent Application No. 16160887.2.

* cited by examiner

Primary Examiner — Keith J Frisby
(74) Attorney, Agent, or Firm — Leason Ellis LLP (57) ABSTRACT

An object is to provide a front fork including a stroke sensor as well as a damping force variable device, and allowing structure of the front fork to be simplified. A front fork of an embodiment includes a pair of a first leg and a second leg. The first leg includes a stroke sensor section that detects a stroke amount of the front fork as a distance between extension and compression of the front fork. The second leg includes a damping force variable device that controls a flow of a working fluid contained in the second leg to enable a damping force to be varied.

10 Claims, 9 Drawing Sheets

FRONT FORK

CROSS-REFERENCE TO RELATED APPLICATION(S)

This application claims priority from Japanese Patent Application No. 2015-066201 filed on Mar. 27, 2015, the entire contents of which are incorporated herein by reference.

BACKGROUND

1. Field

The present invention relates to a front fork.

2. Description of the Related Art

Wheels of a motorcycle are coupled to a main body via a suspension. For example, a front fork is interposed between a front wheel and a main body of the motorcycle. For such a front fork, it may be desirable that a stroke amount of the front fork, as a distance between extension and compression of the front fork, be detected in order to, for example, determine a traveling state of the motorcycle.

Some stroke sensors that detect the stroke amount of the front fork are, for example, installed outside the front fork (for example, see JP-H06-263078-A). Such a stroke sensor, installed outside the front fork, may be damaged by external contact or malicious tampering. Thus, the stroke sensor is desirably provided inside the front fork.

However, when the stroke sensor is provided inside the front fork, a space is needed in which the stroke sensor is arranged. Furthermore, if, along with the stroke sensor, a damping force variable device is provided which adjusts a damping force by controlling a flow of oil contained in the front fork, for example, the stroke sensor and the damping force variable device may disadvantageously interfere with each other.

SUMMARY

A front fork of an embodiment includes a pair of a first leg and a second leg. The first leg internally has a stroke sensor section that detects a stroke amount of the front fork as a distance between extension and compression of the front fork. The second leg includes a damping force variable device that controls a flow of a working fluid contained in the second leg to enable a damping force to be varied.

According to the above-mentioned configuration, the structure of the front fork, which internally includes the stroke sensor and the damping force variable device, can be simplified.

DESCRIPTION OF THE PREFERRED EMBODIMENTS

An embodiment will be described below with reference to the drawings.

Figure 1:
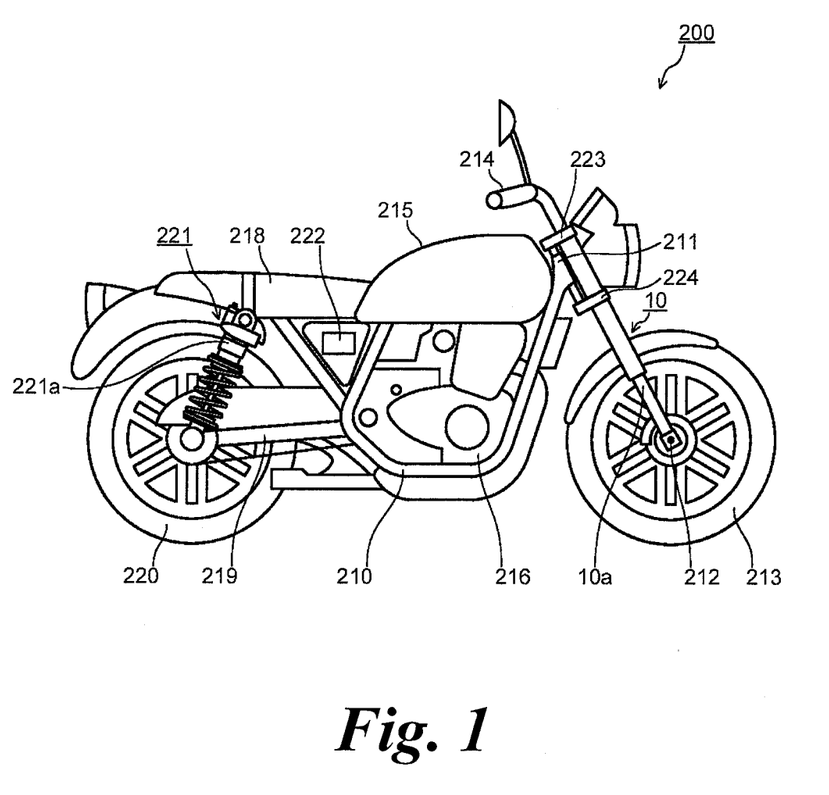
FIG. 1 is a schematic view of a motorcycle including a front fork of an embodiment.

FIG. 1 is a schematic view of a motorcycle 200 including a front fork 10 of an embodiment. As shown in FIG. 1, the motorcycle 200 includes a vehicle body frame 210 forming a part of a vehicle main body, a head pipe 211 attached to a front end of the vehicle body frame 210, a front fork 10 provided on the head pipe 211, and a front wheel 213 attached to a lower end of the front fork 10 via an axle 212.

The front fork 10 includes front fork legs arranged on a corresponding one of right and left sides of the front wheel 213. Specifically, the front fork 10 includes a first leg 10*a* and a second leg 10*b* (not shown in FIG. 1). FIG. 1 shows only the first leg 10*a* arranged on the right side with respect to a traveling direction. Here, an example, in which the first leg 10*a* is arranged on the right side with respect to the traveling direction, is provided. However, the first leg 10*a* may be provided on the left side with respect to the traveling direction. A specific configuration of the front fork 10 will be described below in detail.

The motorcycle 200 includes a handlebar 214 attached to an upper portion of the front fork 10, a fuel tank 215 attached to a upper front portion of the vehicle body frame 210, and an engine 216 arranged below the fuel tank 215.

The motorcycle 200 includes a seat 218 attached to an upper rear portion of the vehicle body frame 210, a swing arm 219 attached to a lower portion of the vehicle body frame 210 so as to be able to swing, a rear wheel 220 attached to a rear end of the swing arm 219, and a left and right pair of rear suspensions 221 attached between the swing arm 219 and the vehicle body frame 210. For the pair of rear suspensions 221, each rear suspension 221 is arranged on a corresponding to one of the right and left sides of the rear wheel 220. FIG. 1 shows only the rear suspension 221*a* arranged on the right side with respect to the traveling direction. The motorcycle 200 further includes a control apparatus 222 that controls the whole motorcycle 200.

The vehicle body frame 210 is, for example, a frame that supports functional members such as the fuel tank 215 and the engine 216 which are included in the vehicle main body. A head pipe 211 is a generally cylindrical member. Into the head pipe 211, a handlebar rotating shaft (not shown in the drawings) is inserted, which is provided integrally with the handlebar 214 and the front fork 10. The head pipe 211 supports the handlebar rotating shaft such that the handlebar rotating shaft is rotatable.

The front wheel 213 is a wheel arranged on a front side of the vehicle body frame 210 with respect to the traveling direction. The handlebar 214 is a member arranged on the front side of the vehicle body frame 210 with respect to the traveling direction, and held by a rider to steer the motorcycle 200. The fuel tank 215 is a container arranged above the vehicle body frame 210 and in which fuel is contained. The engine 216 is a driving source that supplies a driving force that rotates the rear wheel 220.

The seat 218 is a saddle-like seat arranged above the vehicle body frame 210 and which the rider straddles. The swing arm 219 is a member that is swingably supported by the vehicle body frame 210 at a front end of the swing arm 219 with respect to the traveling direction and that supports the rear wheel 220 at a rear end of the swing arm 219 with respect to the traveling direction. The swing arm 219 swings about the front end thereof with respect to the traveling direction so as to follow movement of the rear wheel 220. The rear wheel 220 is a wheel arranged on a rear side of the vehicle body frame 210 with respect to the traveling direction.

The rear suspension 221 is a shock absorber which suppresses transmission of an impact exerted on the rear wheel 220 due to roughness of a road surface or the like to the vehicle body frame 210. The control apparatus 222, for example, includes a CPU (not shown in the drawings) that executes arithmetic processing and controls the whole motorcycle 200 while receiving output signals from a stroke sensor section 100 described below or the like.

(Configuration of the Front Fork 10)

Now, a configuration of the front fork 10 of the embodiment will be described.

The front fork 10 includes the pair of the first leg 10a and the second leg 10b as described above. For example, the first leg 10a internally includes the stroke sensor section 100 that detects a stroke amount that is an extension and compression distance. The second leg 10b includes a damping force variable device 350 that controls a flow of a working fluid (oil) contained in the second leg 10b to enable a damping force to be varied.

(1) First Leg 10a (1-1) Configuration of the First Leg 10a

Figure 2:
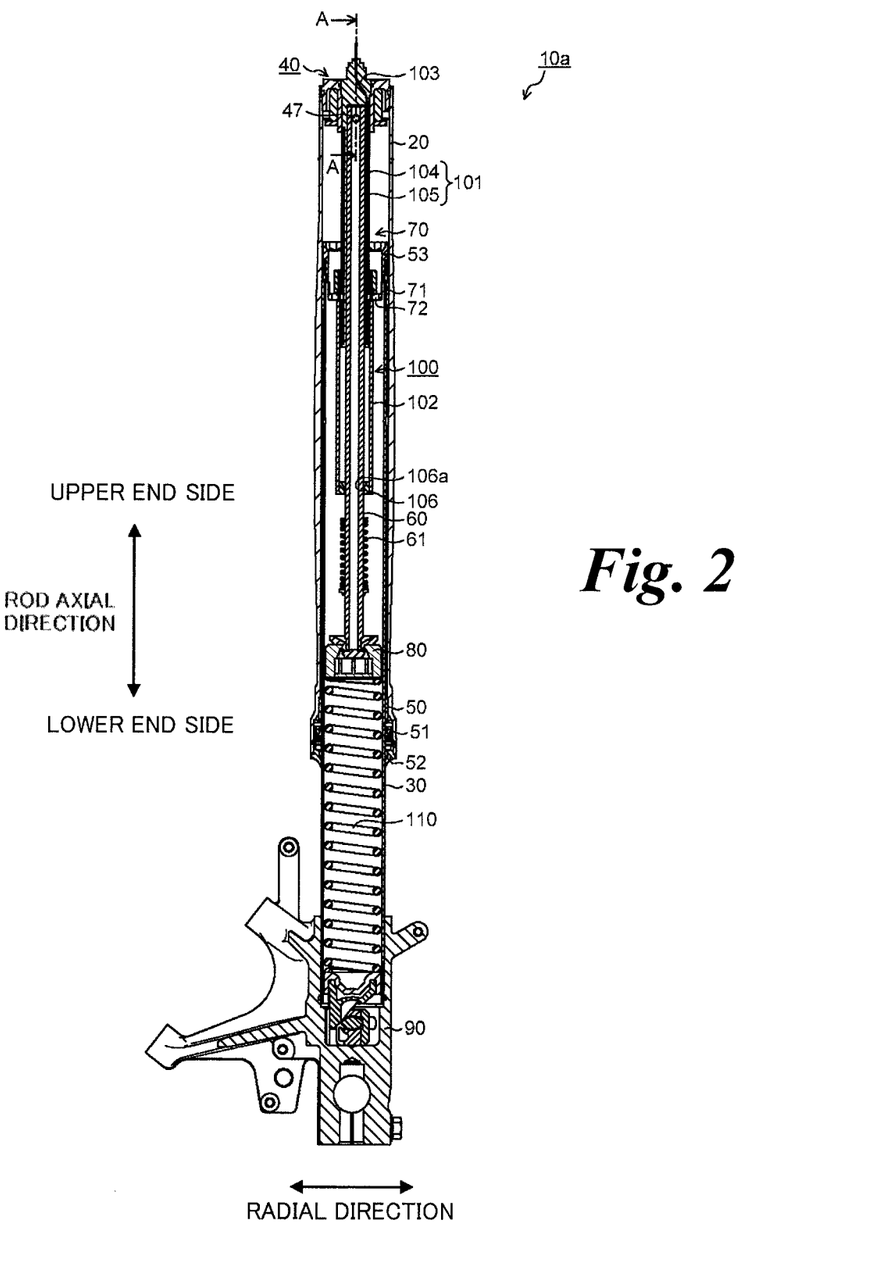
FIG. 2 is a longitudinal cross sectional view of a first leg of the front fork in the embodiment.
Figure 3:
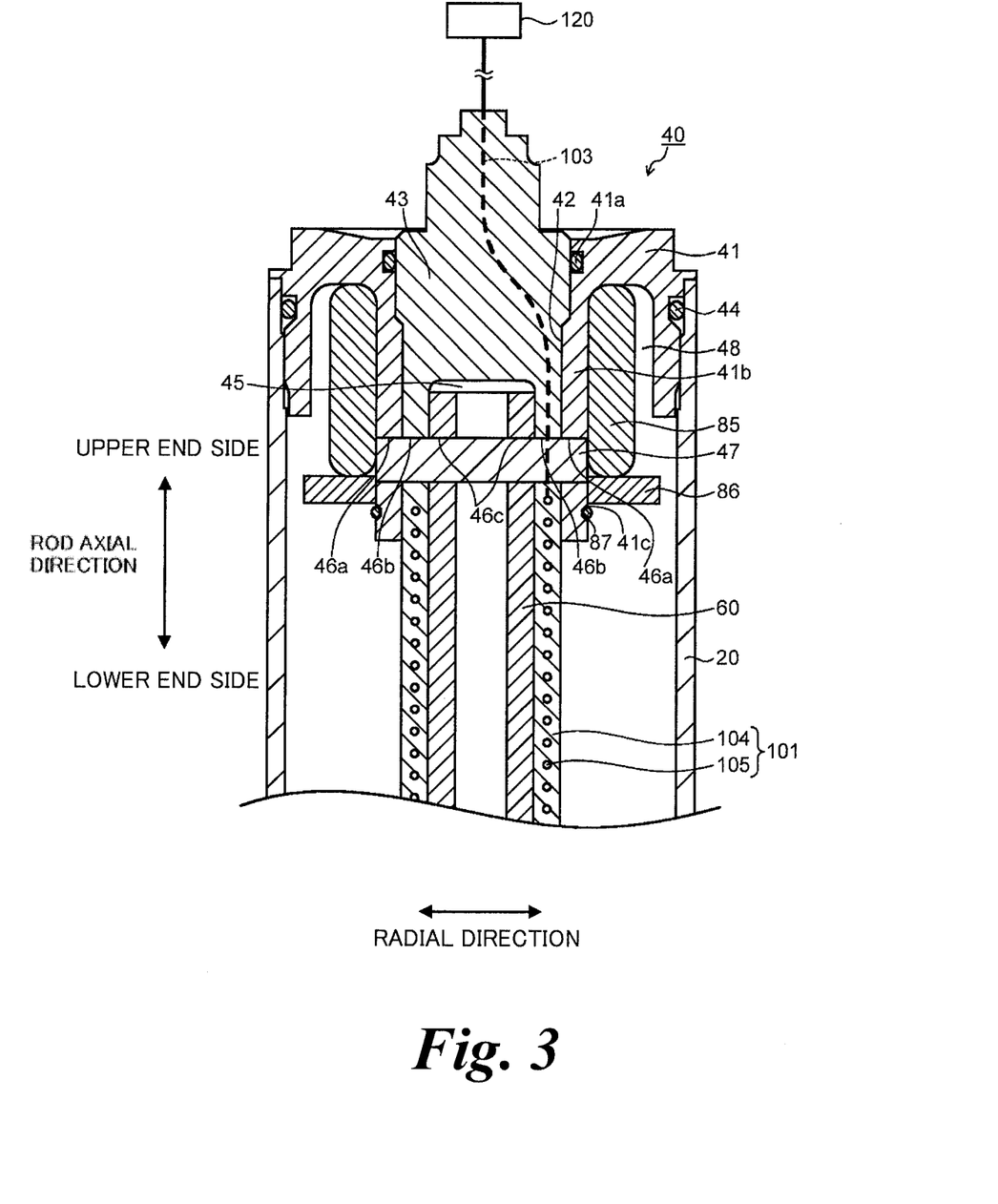
FIG. 3 is a cross sectional view taken along line A-A in FIG. 2.

First, a configuration of the first leg 10a will be described. FIG. 2 is a longitudinal cross sectional view of the first leg 10a of the front fork 10 in the embodiment. FIG. 3 is a cross sectional view taken along line A-A in FIG. 2.

As shown in FIG. 2, the first leg 10a includes a tubular outer tube 20 and a tubular inner tube 30 partly inserted into the outer tube 20 through a bottom of the outer tube 20. As shown in FIG. 1, the first leg 10a is illustrated as an inverted type front fork leg in which the outer tube 20 is attached to the vehicle body, while the inner tube 30 is attached to the axle.

An upper end of the outer tube 20 is attached to the vehicle body of the motorcycle using an upper bracket 223 (see FIG. 1) and a lower bracket 224 (see FIG. 1). As shown in FIG. 2, the upper end of the outer tube 20 is closed by a cap 40. On an inner periphery of an opening at a lower end of the outer tube 20 through which the inner tube 30 extends, a guide bush 50, an oil seal 51, and a dust seal 52 are fitted which are in slidable contact with an outer periphery of the inner tube 30. The outer tube 20 is made of a conductive material, for example, aluminum or iron.

A hollow piston rod 60, an upper end of which is fixed to the cap 40, hangs in an axial central portion of the outer tube 20. A part of the piston rod 60 penetrates a bottomed cylinder-shaped partition member 70 which is placed in the inner tube 30 and is fitted at an upper end thereof. The piston rod 60 is inserted into the inner tube 30 through the upper end of the inner tube 30.

A spring collar 80 is bound to a lower end of the piston rod 60, for example, using a nut (not shown in the drawings). On the other hand, an upper end of the piston rod 60 is fixed to the cap 40 as described above. As shown in FIG. 3, the cap 40 includes a cap main body 41 fitted in an opening at the upper end of the outer tube 20, a through-hole 42 formed in the cap main body 41 so as to penetrate the cap main body 41 in the direction of the central axis of the outer tube 20, and a closure member 43 that closes the through-hole 42 in a liquid-tight manner. The through-hole 42 functions as a central through-hole.

The cap main body 41 is screwed into the outer tube 20, for example. A seal material 44, for example, an O-ring, is provided between the cap main body 41 and the outer tube 20 so as to keep the cap main body 41 and the outer tube 20 liquid tight. A seal material 41a, for example, an O ring, is provided between the cap main body 41 and the closure member 43 so as to keep the cap main body 41 and the closure member 43 liquid tight.

As shown in FIG. 3, the closure member 43 has a recess portion 45 located at a center of a lower end side of the closure member 43 and fitted over the upper end of the piston rod 60. The cap main body 41, the closure member 43, and the piston rod 60 have respective through-holes 46a, 46b, and 46c across the cap main body 41, the closure member 43, and the piston rod 60 in a diametrical direction that is perpendicular to the central axis of the outer tube 20, and the through-holes 46a, 46b, and 46c are aligned.

With the upper end of the piston rod 60 fitted in the recess portion 45, a rod-like member 47 is inserted into the through-holes 46a, 46b, and 46c. Insertion of the rod-like member 47 allows the piston rod 60 to be fixed to the cap main body 41.

As shown in FIG. 3, the closure member 43 is formed, for example, integrally with an insulating member 104 described below.

The cap main body 41 is made of a metallic material such as aluminum. The closure member 43 is made of, for example, a resin material with oil resistance and electric insulation. Examples of the resin material forming the closure member 43 include nylon and PBT (polybutylene terephthalate). The rod-like member 47 is made of a metallic material, for example, iron or aluminum. The cap main body 41 and the rod-like member 47, which are thus made of high-strength materials, allow the piston rod 60 to be reliably supported. Consequently, even when the closure member 43 is formed of a low-strength material such as the resin material, the piston rod 60 can be reliably supported.

As shown in FIG. 3, an annular groove portion 48 is formed at a lower end side of the cap main body 41. An inner peripheral wall portion 41b of the cap main body 41 that forms the groove portion 48 extends to the lower end side. The above-described through-hole 46a is formed in the wall portion 41b of the cap main body 41. Furthermore, the closure member 43 is arranged inside the annular wall portion 41b. A stopper rubber 85 is arranged on an outer periphery of the wall portion 41b of the cap main body 41 into which the rod-like member 47 is inserted. The stopper rubber 85 is made of, for example, rubber. An annular stopper seat 86 formed as a flat plate is arranged so as to contact a lower end of the stopper rubber 85 and such that an inner periphery of the stopper seat 86 contacts an outer periphery of the vicinity of a lower end of the wall portion 41b of the cap main body 41. The stopper seat 86 is made of, for example, aluminum or iron.

A stopper ring 87 is arranged in a groove portion 41c which is formed in the outer periphery of a part of the wall portion 41b of the cap main body 41 and is closer to the lower end side of the wall portion 41b than the stopper seat 86. The stopper ring 87 prevents the stopper seat 86 from falling off from the wall portion 41b of the cap main body 41 toward the lower end side.

The stopper rubber 85, the stopper seat 86, and the stopper ring 87 are thus provided to allow the stopper rubber 85 to be deformed to absorb an impact when, for example, a guide bush 53 provided at the upper end of the inner tube 30 collides against the stopper seat 86. The impact is transmitted to the stopper rubber 85 via the stopper seat 86 to allow damage to the stopper rubber 85 to be suppressed. Moreover, the stopper rubber 85 is arranged on the outer periphery of the wall portion 41b of the cap main body 41 to hold the rod-like member 47 at opposite ends thereof, preventing the rod-like member 47 from slipping out through the through-holes 46a, 46b, and 46c.

A rebound spring 61 is wound around the piston rod 60 above the spring collar 80 as shown in FIG. 2.

As shown in FIG. 2, a lower end of the inner tube 30 is attached to a front axle of the motorcycle via an axle attachment member 90. Using the guide bush 53 fitted on an outer periphery of the upper end of the inner tube 30 and the guide bush 50 fitted on an inner periphery of the lower end of the outer tube 20, the inner tube 30 is held so as to be slidable up and down with respect to the outer tube 20. Thus, an outer diameter of the inner tube 30 is formed to be smaller than an inner diameter of the outer tube 20.

The inner tube 30 is made of a conductive material, for example, aluminum or iron. A predetermined amount of oil is filled in the inner tube 30.

A rod guide 71 through which the piston rod 60 extends is fitted in an axial central portion of a bottom portion of the partition member 70 fitted on an inner periphery of the upper end of the inner tube 30. A communication hole 72 is formed in the rod guide 71 such that an upper side of the rod guide 71 that is closer to the vehicle boy communicates, through the communication hole 72, with a lower side of rod guide 71 that is closer to the axle. When the partition member 70 moves up and down along with the inner tube 30, the oil moves via the communication hole 72.

A suspension spring 110 is interposed between an inner lower end of the inner tube 30 and the spring collar 80. An upper end of the suspension spring 110 is in abutting contact with a lower surface of the spring collar 80. Possible leakage of the oil from the inner tube 30 is prevented by the seal effect of the oil seal 51. Possible entry of dust through an opening at the lower end of the outer tube 20 is prevented by the seal effect of the dust seal 52.

As shown in FIG. 2, the stroke sensor section 100 is provided around the piston rod 60. The stroke sensor section 100 includes a tubular coil portion 101, a tubular conductor member 102, and an output wire 103.

The coil portion 101 is provided around an outer periphery of the piston rod 60 so as to penetrate the rod guide 71 from an upper end side of the piston rod 60 that is closer to the vehicle body toward a lower end side of the piston rod 60. The coil portion 101 includes the insulating member 104 that is a ring-shaped tube and a spiral coil conductor 105 provided inside the insulating member 104.

As described above, the insulating member 104 of the coil portion 101 is, for example, configured integrally with the closure member 43. That is, an upper end of the insulating member 104 is, for example, configured to couple to the closure member 43. The coil conductor 105 is provided so as to extend spirally through the insulating member 104 in an up-down direction. The coil conductor 105 may be, for example, covered with the insulating member 104.

The insulating member 104 is formed of, for example, a resin material with oil resistance and electric insulation. Examples of the resin material forming the insulating member 104 include nylon and PBT (polybutylene terephthalate).

The conductor member 102 has a central axis common to a central axis of the piston rod 60 and is provided inside the inner tube 30 around an outer periphery of the coil portion 101. The conductor member 102 is an annular tube. For example, a slight gap is preferably formed between the conductor member 102 and the coil portion 101 such that the conductor member 102 and the coil portion 101 can be extended and compressed.

An upper end side of the conductor member 102 is, for example, fixed to the rod guide 71. A lower end side of the conductor member 102 is sealed by a sealing member 106. A through-hole 106a through which the piston rod 60 extends is formed in a center of the sealing member 106. The through-hole 106a is formed, for example, to support the piston rod 60, while being slidable along the piston rod 60 in the up-down direction.

The conductor member 102 is also movable along with the inner tube 30 in a direction along the central axis. In this regard, for example, when the first leg 10a is extended to a maximum length as shown in FIG. 2, at least a part of a lower end side of the coil portion 101 is inserted into the conductor member 102. That is, the part of the conductor member 102 constantly overlaps the coil portion 101. Consequently, the stroke sensor section 100 can also measure the stroke amount of the first leg 10a when the first leg 10a is extended to the maximum length. However, the present embodiment is not limited to this configuration. If the stroke amount of the first leg 10a when the first leg 10a is extended to the maximum length needs not be measured and only a predetermined stroke amount of the first leg 10a is intended to be measured, the overlap between the conductor member 102 and the coil portion 101 may be partly omitted.

The conductor member 102 is formed of a nonmagnetic conductor or a conductor with low magnetism. That is, the conductor member 102 is formed of a conductor that is not a ferromagnetic material. The conductor member 102 is made of, for example, aluminum, brass, or copper. The conductor member 102 formed of these materials fulfill a function of a stroke sensor to detect an inductance of the coil conductor 105, which changes with the length over which the coil portion 101 and the conductor member 102 overlap.

The output wire 103 allows an output, to an exterior, of a signal based on the inductance of the coil conductor, which changes an overlapping length of the coil portion 101 and the conductor member 102. The output wire 103 is electrically connected to an upper end of the coil conductor 105. This output wire 103 is constituted of a cable. As shown in FIG. 2 and FIG. 3, the output wire 103 is routed to the insulating member 104 and the closure member 43, which are made of electrically insulating materials, and is led to the exterior through an upper end of the closure member 43.

To electrically connect to an external wire, a connector or the like may be provided at the upper end of the closure member 43 where the output wire 103 is led out. The output wire 103 may be a conductor covered with an electrically insulating material.

As shown in FIG. 3, the output wire 103 is electrically connected to a detection section 120 that detects an amount of change in the inductance of the coil conductor 105. The detection section 120 receives the signal through the output wire 103, and based on the signal, detects the amount of change in the inductance of the coil conductor 105. A function of the detection section 120 is provided, for example, in the control apparatus 222.

Now, a configuration of the detection section 120 will be described below.

Figure 4:
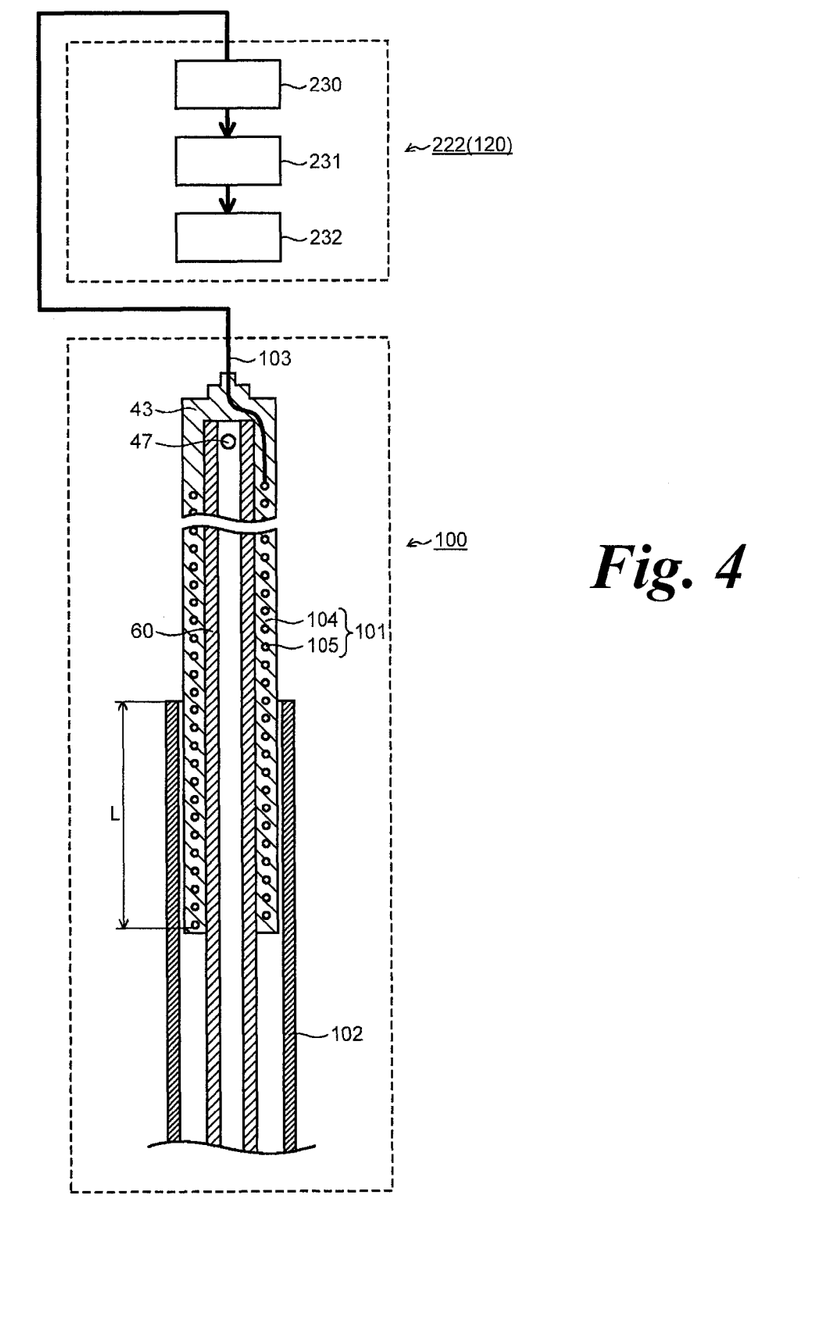
FIG. 4 is a schematic view of a configuration of a stroke sensor section and a detection section of the front fork in the embodiment.

FIG. 4 is a schematic view of a configuration of the stroke sensor section 100 and the detection section 120 of the front fork 10 in the embodiment. An example is illustrated where the function of the detection section 120 is provided in the control apparatus 222. In FIG. 4, some parts of the configuration are omitted or simplified for convenience of description.

The control apparatus 222 includes, for example, a CPU that executes arithmetic processing in order to calculate the stroke amount of the front fork 10, a ROM in which programs executed by the CPU, various data, and the like are recorded, a RAM used as a work memory for the CPU, and an electrically erasable & programmable read only memory (EEPROM). The EEPROM is a type of nonvolatile memory and is used to, for example, store data and the like to be held even when the control apparatus 222 is powered off.

The control apparatus 222 (detection section 120) includes, for example, an oscillation circuit 230, a timer section 231, and an arithmetic section 232.

The oscillation circuit 230 is electrically connected to the output wire 103. The oscillation circuit 230 receives the signal through the output wire 103 and detects the inductance of the coil conductor 105 (information on the inductance) to oscillate at a frequency according to the change in the inductance of the coil conductor 105. Using this LC oscillation scheme in which a change in oscillation frequency resulting from the change in the inductance of the coil conductor 105 is captured as a signal, the accuracy and resolution of reading of the stroke amount can be increased.

The timer section 231 measures an oscillation period (frequency) of the oscillation circuit 230 and outputs a sensor value (frequency) according to a stroke position of the front fork 10.

The arithmetic section 232 executes predetermined calculations based on the sensor value output from the timer section 231 and a table recorded in a recording section (not shown in the drawings), to calculate the stroke position and stroke speed of the front fork 10. In this case, the table (not shown in the drawings) recorded in the recording section, for example, pre-specifies relation between the sensor value changing with the amount of the change in the inductance of the coil conductor 105 and the stroke position of the front fork 10.

The example has been illustrated where the control apparatus 222 includes the oscillation circuit 230, the timer section 231, and the arithmetic section 232. However, at least one of the oscillation circuit 230, the timer section 231, and the arithmetic section 232 may be provided in the stroke sensor section 100, that is, in the front fork 10. For example, if all of the oscillation circuit 230, the timer section 231, and the arithmetic section 232 are provided in the insulating member 104, the front fork 10 can be more compactly designed.

(1-2) Operation of the First Leg 10a

Now, the operation of the first leg 10a will be described with reference to FIG. 2 and FIG. 4. In particular, the operation of the stroke sensor section 100 and the detection section 120 in the first leg 10a will be described.

A change in the stroke amount of the first leg 10a of the front fork 10 causes movement of the inner tube 30 and the outer tube 20 relative to each other in the up-down direction. Then, the insertion length L of a part the coil portion 101 inserted into the conductor member 102 changes as depicted in FIG. 4.

When, for example, electricity flows through the coil conductor 105, a magnetic flux penetrating an inner side of the coil portion 101 is generated on the same axis as that of the first leg 10a. The magnetic flux causes an eddy current to be generated in the tubular conductor member 102.

When an amount of magnetic flux generated in the coil conductor 105 increases, the eddy current generated in the conductor member 102 causes generation of a magnetic flux in the conductor member 102 in a direction opposite to the direction of the magnetic flux generated in the coil conductor 105. This reduces the magnetic flux generated in the coil conductor 105. On the other hand, when the amount of magnetic flux generated in the coil conductor 105 decreases, the eddy current generated in the conductor member 102 causes generation of a magnetic flux in the conductor member 102 in the same direction as that of the magnetic flux generated in the coil conductor 105. This increases the magnetic flux generated in the coil conductor 105.

For example, in the compression side stroke, when the first leg 10a is compressed to increase the insertion length L of the part of the coil conductor 105 inserted into the conductor member 102, the inductance of the coil conductor 105 itself decreases to reduce the magnetic flux in the coil conductor 105 itself. On the other hand, in the extension side stroke, when the first leg 10a is extended to reduce the insertion length L of the part of the coil conductor 105 inserted into the conductor member 102, the inductance of the coil conductor 105 itself increases to increase the magnetic flux in the coil conductor 105 itself.

As described above, the inductance of the coil conductor 105 changes due to a magnetic change in and around the coil conductor 105 caused by a change in the insertion length L. While the motorcycle is traveling, when the front fork 10 is extended or compressed, the conductor member 102 moves along with the inner tube 30 in the up-down direction. Then, the amount of change in the stroke of the first leg 10a is reflected in the amount of change in insertion length L. Thus, the amount of change in the insertion length L can be detected as the amount of change in the inductance of the coil conductor 105.

The detection section 120 (control apparatus 222) detects a change in oscillation frequency resulting from the above-described change in inductance. Thus, in the detection section 120 (control apparatus 222), a table is pre-stored which indicates a calculation of the stroke length of the front fork 10 (first leg 10a) corresponding to the oscillation frequency associated with the change in the inductance of the coil conductor 105. Then, the stroke amount (length) of the front fork 10 (first leg 10a) can be detected.

The stroke amount of the front fork 10 refers to the amount of change in the length of the front fork 10, that is, the first leg 10a with respect to the reference length of the first leg 10a. The insertion length L of the part of the coil portion 101 inserted into the conductor member 102 refers to a length of an area where the conductor member 102 and the coil conductor 105 of the coil portion 101 lie opposite to each other. In FIG. 4, the insertion length L is equal to an axial length of the part of the coil conductor 105 inserted into the conductor member 102.

The amount of change in the inductance of the coil conductor 105 and the amount of change in insertion length L have a generally linear relation. When the first leg 10a is extended to the maximum length, at least a part of the lower end side of the coil portion 101 is inserted into the conductor member 102. Thus, even when the first leg 10a is at the reference length, at least a part of the lower end side of the coil portion 101 is inserted into the conductor member 102.

That is, the inductance of the predetermined coil conductor 105 is obtained even when the first leg 10*a* is at the reference length.

In a specific operation of the stroke sensor section 100 and the detection section of the first leg 10*a*, a signal relating to the inductance of the coil conductor 105 is output to the oscillation circuit 230 via the output wire 103 in accordance with the amount of change in insertion length L as shown in FIG. 4.

Based on the signal through the output wire 103, the oscillation circuit 230 oscillates at a period according to the change in the inductance of the coil conductor 105. Subsequently, the timer section 231 measures the oscillation period of the oscillation circuit 230 to output a sensor value according to the stroke position of the front fork 10.

Subsequently, the arithmetic section 232 calculates the stroke position of the front fork 10 based on the sensor value output from the timer section 231 and the table recorded in the recording section. Furthermore, the arithmetic section 232 differentiates the stroke position to calculate a stroke speed.

As described above, when the stroke sensor section 100 is provided in the first leg 10*a*, one of the legs of the front fork 10 in the embodiment, for example, the amount of change in the length of the front fork 10 with respect to the reference length of the front fork 10 can be detected while the motorcycle is traveling.

In the front fork 10 of the embodiment, the stroke sensor section 100 can be provided in the first leg 10*a*. Thus, the stroke sensor section 100 can be protected from external contact, malicious tampering, or the like.

The first leg 10*a* including the stroke sensor section 100 has been described. The first leg 10*a* may further include, for example, a damping force generating apparatus. Unlike the damping force variable device 350 in the second leg 10*b*, the damping force generating apparatus provided in the first leg 10*a* may have a simple configuration with no function to adjust a damping force.

Specifically, for example, the damping force generating apparatus provided in the first leg 10*a* may be configured to apply flow resistance in association with the stroke of the front fork 10 when a working fluid such as oil flows through a gap or an orifice provided in the first leg 10*a*.

Figure 9:
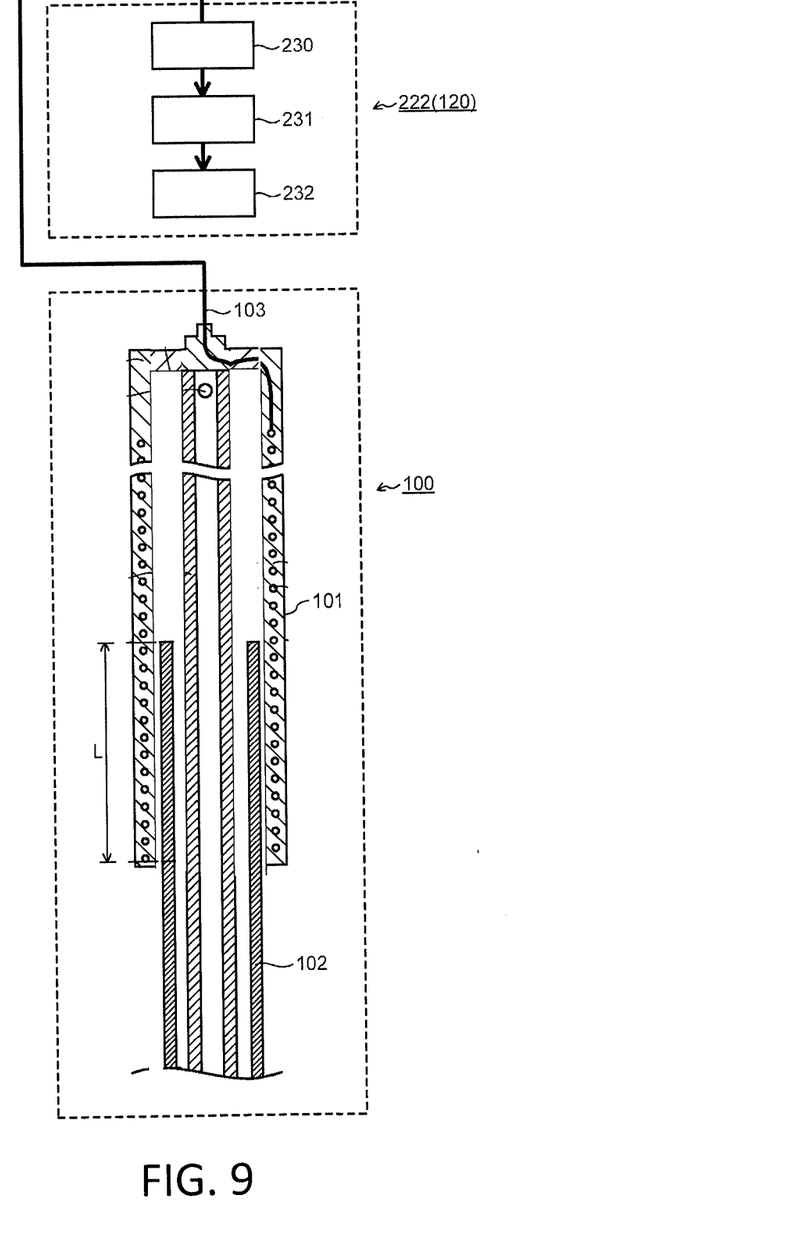
FIG. 9 is a schematic view of a configuration of a stroke sensor section and a detection section of the front fork in another embodiment.

In the above-described embodiment, a configuration in which the coil portion 101 is inserted into the conductor member 102 is illustrated as the stroke sensor section 100. However, a configuration is possible in which, as shown in FIG. 9 for example, the conductor member 102 is inserted into the coil portion 101. In this case, when the first leg 10*a* is extended to the maximum length, at least a part of the lower end side of the coil portion 101 covers an outer periphery of the conductor member 102. That is, a part of the conductor member 102 constantly overlaps the coil portion 101. Consequently, the stroke sensor section 100 can also measure the stroke of the first leg 10*a* when the first leg 10*a* is extended to the maximum length. However, the present embodiment is not limited to this configuration. If the stroke of the first leg 10*a* obtained when the first leg 10*a* is extended to the maximum length need not be measured and only a certain given stroke amount of the first leg 10*a* is intended to be measured, it is not necessary that the conductor member 102 and the coil portion 101 always overlap.

(2) Second Leg 10*b*

(2-1) Configuration of the Second Leg 10*b*

Figure 5:
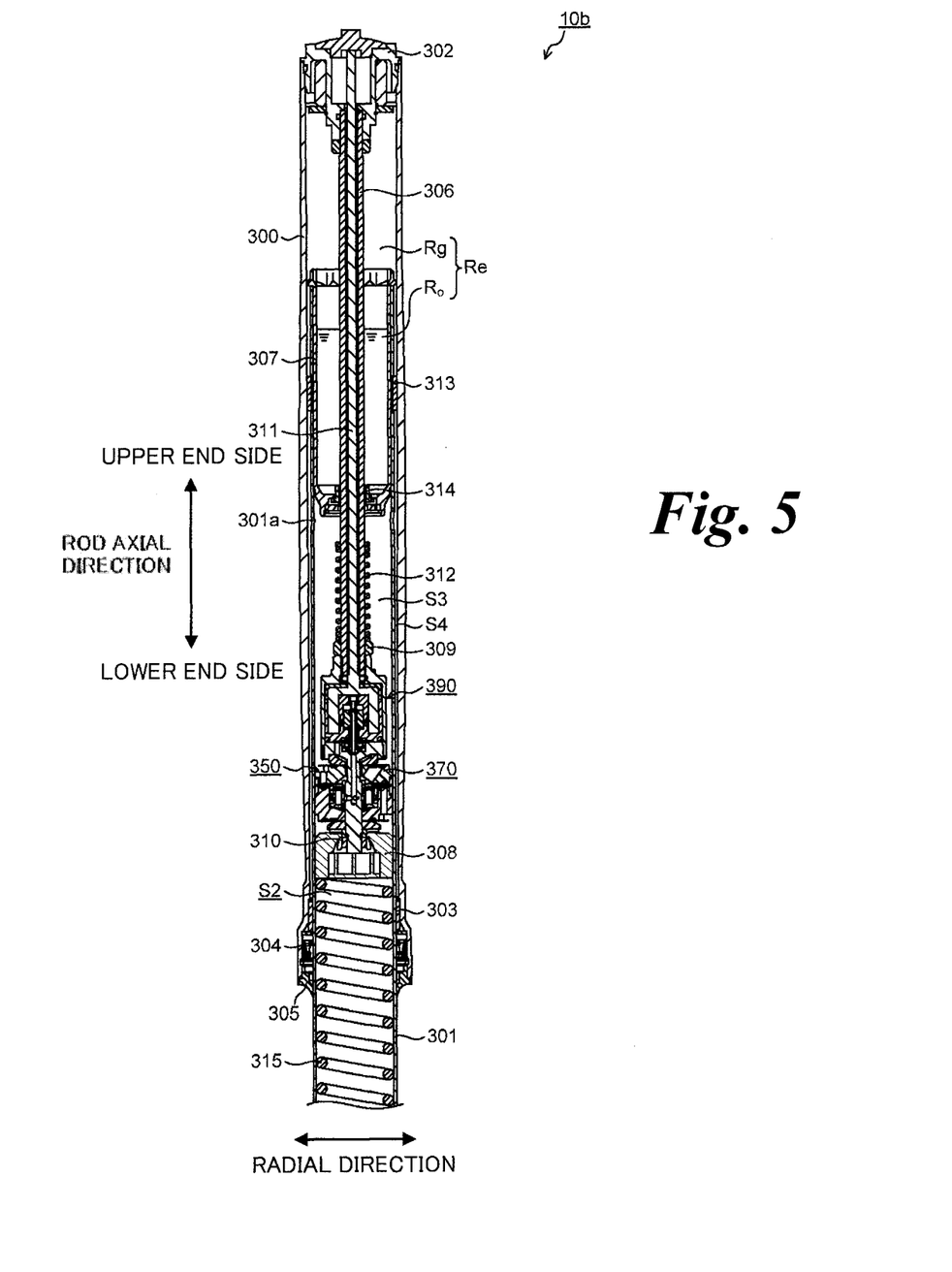
FIG. 5 is a longitudinal cross sectional view of a second leg of the embodiment.

Now, a configuration of the second leg 10*b* will be described. FIG. 5 is a drawing showing a longitudinal cross section of the second leg 10*b* of the front fork 10 in the embodiment. In FIG. 5, the axle side (lower end side) configuration is omitted. The axle side configuration of the second leg 10*b* is similar to the axle side configuration of the first leg 10*a*.

As shown in FIG. 5, in the second leg 10*b*, a part of an inner tube 301 attached to the axle is inserted into an outer tube 300 attached to the vehicle body, through a lower end of the outer tube 300.

An upper end of the outer tube 300 is attached to the vehicle body of the motorcycle using an upper bracket 223 (see FIG. 1) and a lower bracket 224 (see FIG. 1). The upper end of the outer tube 300 is closed by a cap bolt 302. On an inner periphery of an opening at the lower end of the outer tube 300 through which the inner tube 301 extends, a guide bush 303, an oil seal 304, and a dust seal 305 are fitted which are in slidable contact with an outer periphery of the inner tube 301.

In an axial central portion in the outer tube 300, a hollow piston rod 306 hangs which is attached to the cap bolt 302 at an upper end of the piston rod 306. A part of the piston rod 306 penetrates a bottomed cylinder-shaped partition member 307 fitted at an inner upper end of the inner tube 301 and is inserted into the inner tube 301 from above. A solenoid 390 that constitutes an actuator for the damping force variable device 350, a piston 370, and a spring collar 308 are attached to a lower end of the piston rod 306 using an upper nut 309 and a lower nut 310. A main section of the damping force variable device 350 is incorporated in the piston 370. A power supply cord 311 through which power is fed to the solenoid 390 is inserted through the piston rod 306. A rebound spring 312 is wound around the piston rod 306 above the nut 309.

The inner tube 301 is attached to a front axle of the motorcycle via an axle attachment member (not shown in the drawings). A part of the inner tube 301 inserted into the outer tube 300 is held by a guide bush 313 fitted on an outer periphery of an upper end of the inner tube 301 and the guide bush 303 fitted on an inner periphery of a lower end of the outer tube 300 such that the inner tube 301 is slidable with respect to the outer tube 300 in the up-down direction. An annular oil chamber S4 sealed at an upper and a lower positions thereof by the guide bushes 313 and 303, respectively, is formed in a gap between the inner periphery of the outer tube 300 and the outer periphery of the inner tube 301. A communication hole 301*a* is formed in an area of the inner tube 301 below a partition member 307 such that a rod side oil chamber S3 in the inner tube 301 and the annular oil chamber S4 communicate with each other through the communication hole 301*a*.

A rod guide 314 through which the piston rod 306 extends is fitted in an axial central portion of a bottom portion of the partition member 307 fitted on an inner periphery of the upper end of the inner tube 301. The piston rod 306 is held by the rod guide 314 so as to be slidable in the up-down direction.

A piston 370 is fitted on the inner periphery of the inner tube 301 so as to be slidable in the up-down direction. An interior enclosed by the outer tube 300 and the inner tube 301 is partitioned into an upper space and a lower space by the partition member 307. The upper space is an oil storage chamber Re functioning as a reservoir. The oil storage chamber Re includes an oil storing portion from which oil is fed to the rod side oil chamber S3 and into which oil from the rod side oil chamber is discharged and a gas storing portion Rg in which a gas such as air is filled; an oil surface functions as a boundary between the oil storing portion Ro and the gas storing portion Rg.

A space in the inner tube 301 below the partition member 307 is partitioned into the rod side oil chamber S3 and a piston side oil chamber S2 by the piston 370. The rod side oil chamber S3 and the piston side oil chamber S2 are filled with oil that is a working fluid.

A suspension spring 315 is interposed between an inner bottom portion of the inner tube 301 and a spring collar 308. Possible leakage of the oil from the inner tube 301 is prevented by a sealing effect of the oil seal 304. Possible entry of dust through the opening at the lower end of the outer tube 300 is prevented by a sealing effect of the dust seal 305.

Now, a configuration of the damping force variable device 350 will be described with reference to FIG. 6.

Figure 6:
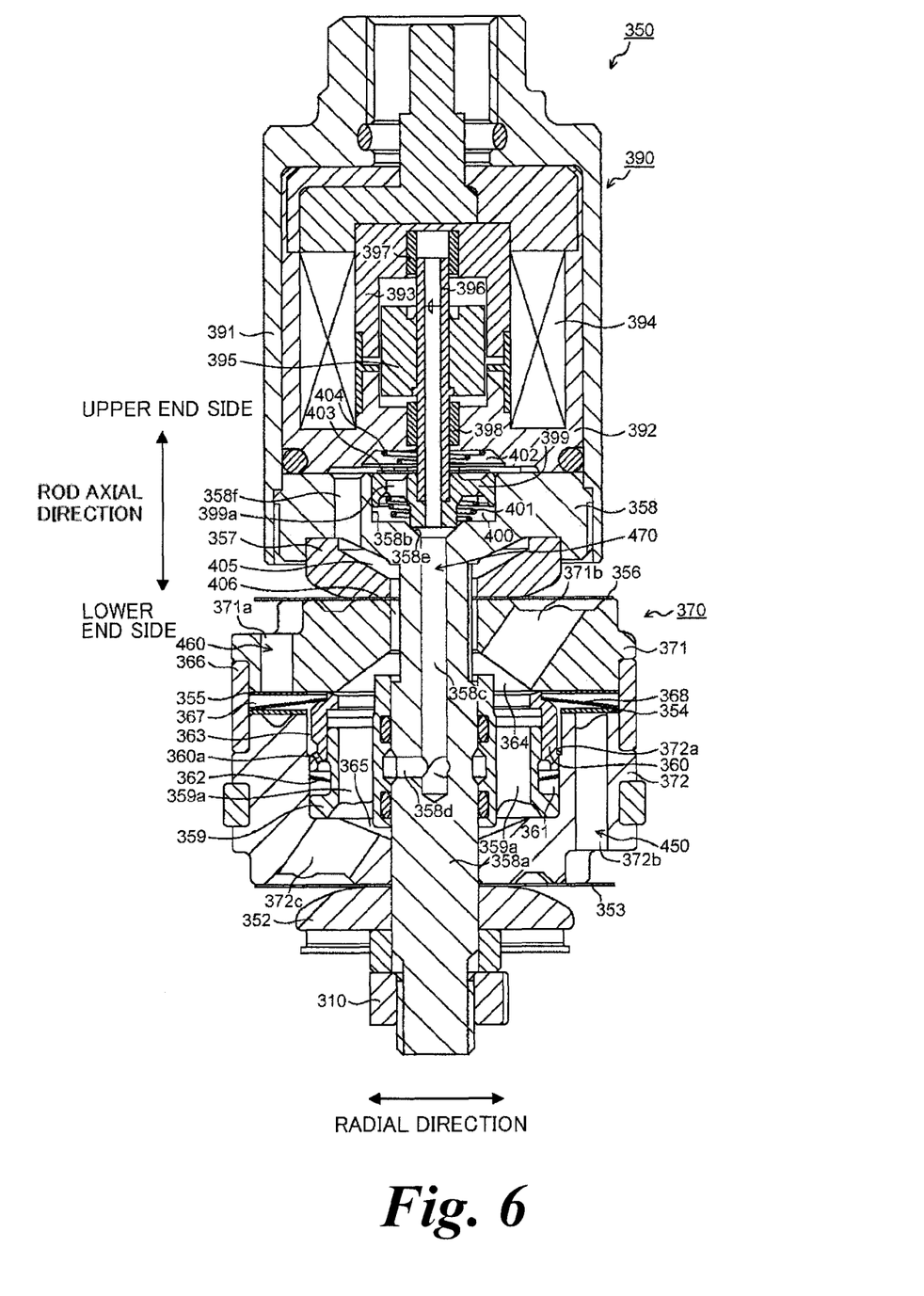
FIG. 6 is a longitudinal cross sectional view of a damping force variable device in the second leg of the front fork in the embodiment.

FIG. 6 is a drawing showing a longitudinal cross section of the damping force variable device 350 in the second leg 10b of the front fork 10 in the embodiment.

The main section of the damping force variable device 350 is incorporated in the piston 370. The piston 370 is divided into an upper piston 371 and a lower piston 372. The damping force variable device 350 is configured by sequentially assembling a valve stopper 352, an extension side outlet check valve 353, the lower piston 372, a compression side inlet check valve 354, an extension side inlet check valve 355, the upper piston 371, a compression side outlet check valve 356, a valve stopper 357, a valve seat member 358, and a solenoid 390 in this order from bottom to top in the up-down direction (axial direction).

A rod portion 358a protrudes integrally downward from an axial central portion of the valve seat member 358. The rod portion 358a penetrates radially central portions of the valve stopper 357, the compression side outlet check valve 356, the upper piston 371, the extension side inlet check valve 355, the compression side inlet check valve 354, the lower piston 372, the extension side outlet check valve 353, and the valve stopper 352. A nut 310 is screwed on a lower end of the rod portion 358a.

A main valve member 359 fitted over an outer periphery of the rod portion 358a of the valve seat member 358 is housed in a recess portion 372a of the lower piston 372. A generally cylindrical main valve 360 is fitted on an outer periphery of the main valve member 359 so as to be slidable in the up-down direction. An annular pilot chamber (back pressure chamber) 361 defined by the main valve member 359 is formed behind (a lower side of FIG. 6) a main valve 360 in the recess portion 372a. In the pilot chamber 361, a plate spring 362 is housed which exerts an upward bias force (in a direction in which the valve is closed) to seat the main valve 360 on a lower surface (seating surface) of the upper piston 371.

A channel 363 is formed between the recess portion 372a in the lower piston 372 and an outer periphery of the main valve 360. The channel 363 is in communication with the pilot chamber 361 via an oil hole 360a formed in the main valve 360.

A space 364 is defined by an inner periphery of a lower portion of the upper piston 371. An oil hole 371a is formed in the upper piston 371 so as to penetrate the upper piston 371 in the up-down direction, and an oblique oil hole 371b is also formed in the upper piston 371. The oil hole 371a is normally open to the rod side oil chamber S3 (see FIG. 5) in the inner tube 301 and is selectively opened and closed by the extension side inlet check valve 355. The oil hole 371b is normally open to the space 364 and is selectively opened and closed by the compression side outlet check valve 356.

A space 365 is defined by an inner periphery of a lower portion of the lower piston 372. An oil hole 372b is formed in the lower piston 372 so as to penetrate the lower piston 372 in the up-down direction, and an oblique oil hole 372c is also formed in the lower piston 372. The oil hole 372b is normally open to the piston side oil chamber S2 (see FIG. 5) in the inner tube 301 and is selectively opened and closed by the compression side inlet check valve 354. The oil hole 372c is normally open to the space 365 and is selectively opened and closed by the extension side outlet check valve 353.

A recess portion 358b that is open upward is formed at an upper portion of an axial center of the valve seat member 358. An oil hole 358c is formed in the recess portion 358b so as to extend downward along an axial center of the rod portion 358a. An oil hole 358d extending radially outward from a lower end of the oil hole 358c is formed, for example, at a right angle to the oil hole 358c. The oil hole 358d is in communication with the pilot chamber 361 via an oil hole (not shown in the drawings) formed in the main valve member 359 so as to extend in the radial direction.

A plurality of oil holes 359a is formed in the main valve member 359 so as to penetrate the main valve member 359 in the axial direction. The oil holes 359a each communicate, at one end (upper end) thereof, with the oil hole 371b in the upper piston 371 via the space 364 in the upper piston 371, and at the other end (lower end) thereof, with the oil hole 372c in the lower piston 372 via the space 365 in the lower piston 372.

A gap 367 extending in the up-down direction is formed between the upper piston 371 and the lower piston 372 by a ring-shaped distance collar 366 fitted over outer peripheries of both pistons 371 and 372. The compression side inlet check valve 354 and the extension side inlet check valve 355 are provided in the gap 367. The compression side inlet check valve 354 and the extension side inlet check valve 355 are biased in a direction in which the oil hole 372b in the lower piston 372 and the oil hole 371a in the upper piston 371 are closed, by a plate spring 368 interposed between the compression side inlet check valve 354 and the extension side inlet check valve 355.

Now, a configuration of the solenoid 390 will be described.

The solenoid 390 includes a cylindrical case 391 in which an inner periphery of an opening at a lower end of the case 391 is screwed on an outer periphery of the valve seat member 358, two bottomed cylindrical cores 392 and 393, an annular coil 394, a plunger 395 housed in the cores 392 and 393, and a hollow actuation rod 396 penetrating an axial central portion of the plunger 395. The actuation rod 396 is supported by cylindrical guide bushes 397, 398 at respective opposite ends of the actuation rod 396 in the up-down direction so as to be movable in the up-down direction. A pilot valve 399 is attached to an outer periphery of a lower end of the actuation rod 396 that faces an inside of the recess portion 358b of the valve seat member 358.

The pilot valve 399 is fitted on an inner periphery of the recess portion 358b of the valve seat member 358 so as to be movable in the up-down direction. The pilot valve 399 is selectively seated in a tapered valve seat 358e formed at an upper end of the oil hole 358c formed in an axial central portion of the valve seat member 358 to open or close the oil hole 358c. A space 400 defined by the pilot valve 399 is formed in the recess portion 358b of the valve seat member 358. In the space 400, a spring 401 is housed which biases the pilot valve 399 in a direction in which the pilot valve 399 is opened (upward in FIG. 6). The space 400 formed in the valve seat member 358 is in communication with the pilot chamber 361 via the oil holes 358c and 358d in the valve seat member 358 and an oil hole formed in the main valve member 359. An oil hole 399a is formed in the pilot valve 399 so as to penetrate the pilot valve 399. The oil hole 399a is normally open to the space 400.

A recessed space 402 is formed between an end surface of a core 392 of the solenoid 390 and the valve seat member 358. In the space 402, a fail-safe valve 403 is provided which selectively opens or closes the oil hole 399a in the pilot valve 399. The fail-safe valve 403 is held on an outer periphery of the actuation rod 396 so as to be slidable in the up-down direction. The fail-safe valve 403 is biased in a direction in which the fail-safe valve 403 is closed (downward in FIG. 6), by a spring 404 housed in the space 402. A spring constant of the spring 404 is set smaller than a spring constant of the spring 401 that biases the pilot valve 399 in the direction in which the pilot valve 399 is opened.

An oil hole 358f is formed in the valve seat member 358 so as to penetrate the valve seat member 358 in the up-down direction. The space 402 is in communication with the space 364 in the upper piston 371 via the oil hole 358f, an annular channel 405 formed between the valve stopper 357 and the valve seat member 358, and an annular channel 406 formed between the upper piston 371 and the rod portion 358a of the valve seat member 358.

In the damping force variable device 350 configured as described above, the oil hole 372b in the lower piston 372, the gap 367, the space 364 in the upper piston 371, and the oil hole 371b in the upper piston 371 form a main channel 450 for a compression side stroke. The main channel 450 is provided with the main valve 360, the compression side inlet check valve 354, and the compression side outlet check valve 356. The oil hole 371a in the upper piston 371, the gap 367, the oil holes 359a in the main valve member 359, and the oil hole 372c in the lower piston 372 form a main channel 460 for an extension side stroke. The main channel 460 is provided with the main valve 360, the extension side inlet check valve 355, and the extension side outlet check valve 353.

The following form a compression and extension side pilot channel 470: the gap 367 between the upper piston 371 and the lower piston 372, the channel 363 formed around the outer periphery of the main valve 360, the oil hole 360a in the main valve 360, the pilot chamber 361, the oil hole (not shown in the drawings) formed in the main valve member 359, the oil holes 358c and 358d formed in the valve seat member 358, the space 400 defined by the pilot valve 399 and the valve seat member 358, the oil hole 399a formed in the pilot valve 399, the space 402 formed in the core 392 of the solenoid 390, the oil hole 358f formed in the valve seat member 358, the channel 405 formed between the valve stopper 357 and the valve seat member 358, the channel 406 being continuous with the channel 405, and the space 364 in the upper piston 371. The pilot channel 470 is provided with the pilot valve 399 and the fail-safe valve 403. The channel 363 and the oil hole 360a in the main valve 360 also function as a bypass channel through which a portion of the oil flowing through the main channels 450 and 460 is guided to the pilot chamber 361.

(2-2) Operation of the Second Leg 10b

Figure 7:
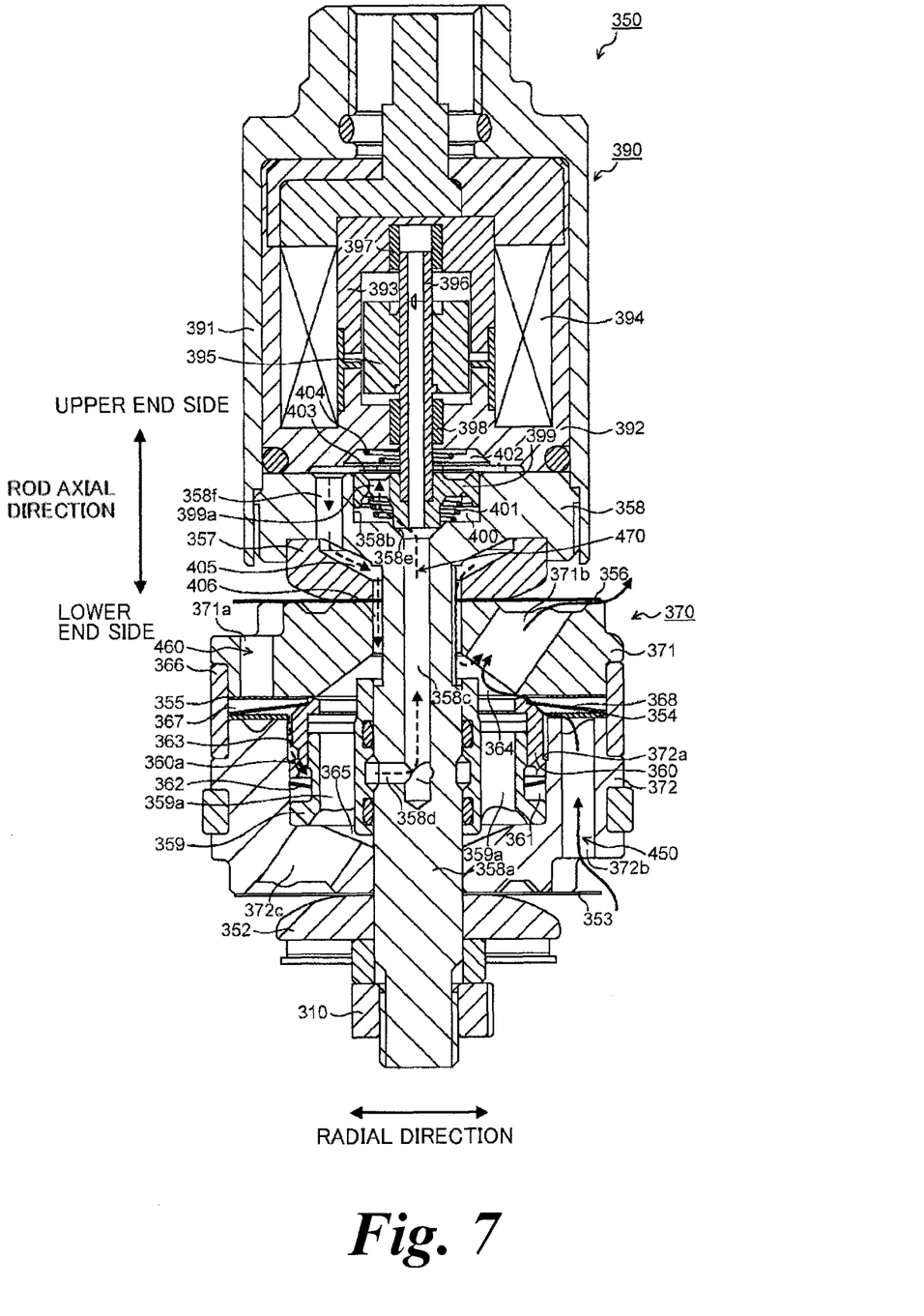
FIG. 7 is a longitudinal cross sectional view of the damping force variable device in the second leg of the front fork in the embodiment and illustrates a flow of oil during a compression side stroke.
Figure 8:
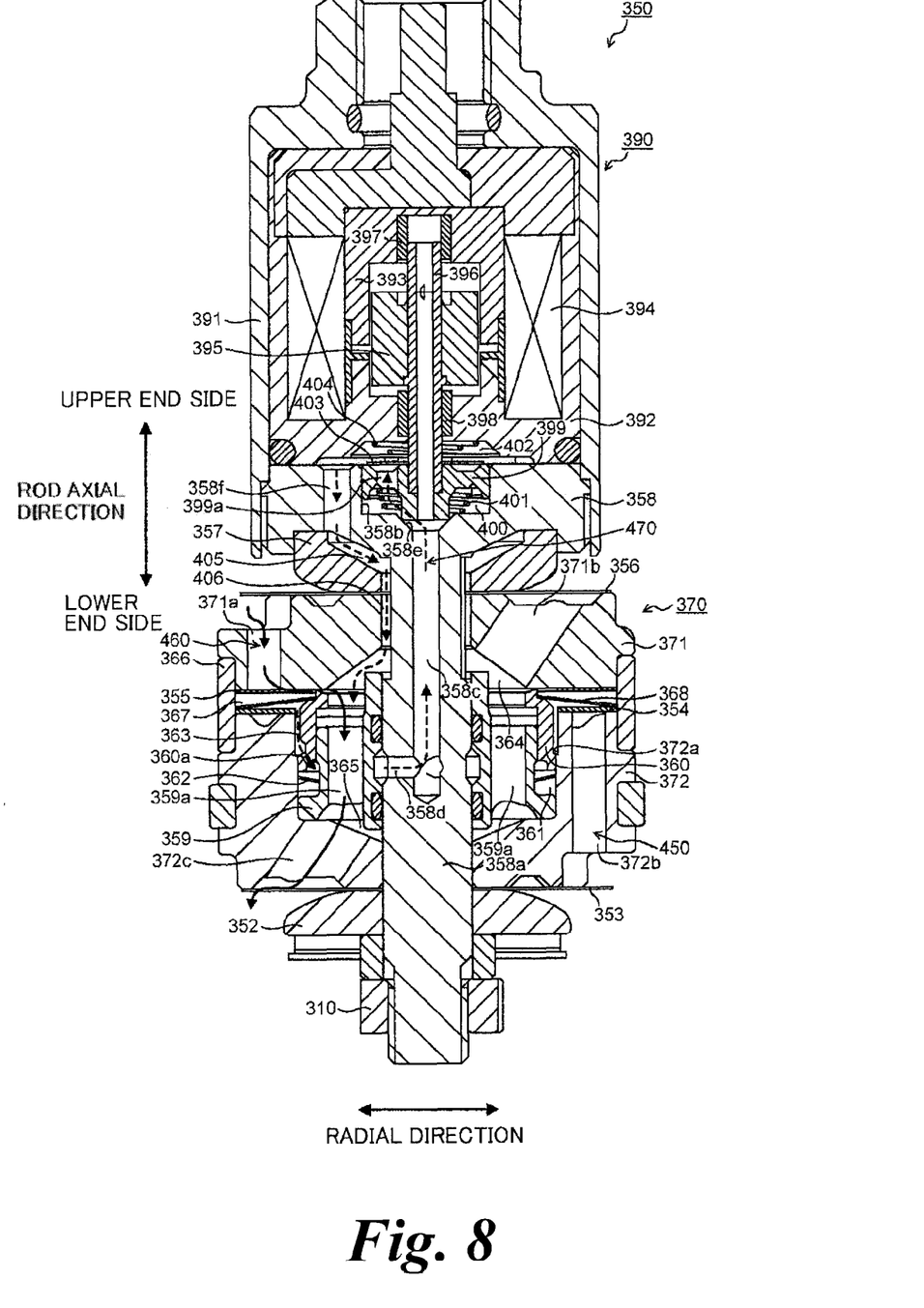
FIG. 8 is a longitudinal cross sectional view of the damping force variable device in the second leg of the front fork in the embodiment and illustrates a flow of oil during an extension side stroke.

Now, the operation, during the compression side stroke and the extension side stroke, of the second leg 10b configured as described above will be described with reference to FIG. 7 and FIG. 8. FIG. 7 is a drawing showing a longitudinal cross section of the damping force variable device 350 in the second leg 10b of the front fork 10 in the embodiment and illustrating a flow of oil during the compression side stroke. FIG. 8 is a drawing showing a longitudinal cross section of the damping force variable device 350 in the second leg 10b of the front fork 10 in the embodiment and illustrating a flow of oil during the extension side stroke.

(Compression Side Stroke)

First, the operation of the second leg 10b during the compression side stroke will be described with reference to FIG. 7.

While the motorcycle is traveling, when the front wheel moves up and down due to the roughness of the road surface, the outer tube 300 and the inner tube 301 in the second leg 10b, which suspend the front wheel, are compressed and extended. During the compression side stroke where the inner tube 301 moves upward relative to the outer tube 300, the oil in the piston side oil chamber S2 is compressed by the piston 370, and pressure in the piston side oil chamber S2 is increased.

The oil in the piston side oil chamber S2 flows through the main channel 450 for the compression side stroke into the rod side oil chamber S3. Specifically, as depicted by solid arrows in FIG. 7, the oil flows from the piston side oil chamber S2 through the oil hole 372b in the lower piston 372 to push open the compression side inlet check valve 354 against a bias force of the plate spring 368. The oil then flows to the gap 367 and exerts pressure to push open the main valve 360 against a force generated by the plate spring 368 and the back pressure in the pilot chamber 361 and acting in a direction in which the main valve 360 is closed. The oil then passes from the gap 367 through the oil hole 371b in the upper piston 371 via the space 364 to push open the compression side outlet check valve 356 and subsequently flows into the rod side oil chamber S3. At this time, flow resistance generated when the oil passes through the main valve 360 causes exertion of a compression side damping force in the second leg 10b.

On the other hand, a portion of the oil having flown from the piston side oil chamber S2 through the oil hole 372b in the lower piston 372 into the gap 367 joins to the oil flowing in the main channel 450 through the pilot channel 470. Specifically, as depicted by dashed arrows in FIG. 7, a portion of the oil having flown from the piston side oil chamber S2 through the oil hole 372b in the lower piston 372 into the gap 367 flows through the channel 363 around the outer periphery of the main valve 360 and through the oil hole 360a in the main valve 360 into the pilot chamber 361. The oil then flows from the pilot chamber 361 through the oil hole (not shown in the drawings) in the main valve member 359, the oil holes 358d and 358c in the valve seat member 358, and the gap between the pilot valve 399 and the valve seat 358e into the space 400 in the valve seat member 358. Consequently, the oil having flown into the space 400 in the valve seat member 358 passes through the oil hole 399a in the pilot valve 399 to push open the fail-safe valve 403 against the bias force of the spring 404 and then flows into the space 402 in the core 392. The oil then flows from the space 402 through the oil hole 358f in the valve seat member 358 and the channels 405 and 406 into the space 364 in the upper piston 371, and in the space 364, joins to the oil flowing through the main channel 450.

Then, the solenoid 390 is driven to move the actuation rod 396 and the pilot valve 399 attached to the actuation rod 396, in the up-down direction, to change an opening degree of the pilot valve 399. This allows adjustment of the flow resistance of the oil passing through the pilot valve 399 and thus adjustment of the back pressure of the pilot chamber 361. The opening degree of the main valve 360 can be adjusted by controlling a force resulting from the back pressure and pressing the main valve 360 in the direction in which the main valve 360 is closed.

Adjusting the opening degree of the main valve 360 as described above allows adjustment of a damping force resulting from the flow resistance of the oil passing through the main valve 360. Specifically, reducing the opening degree of the pilot valve 399 increases the back pressure of the pilot chamber 361 to reduce the opening degree of the main valve 360, while increasing the damping force. On the other hand, adjusting the opening degree of the pilot valve 399 to a larger value also increases the opening degree of the main valve 360 to adjust the damping force to a smaller value.

As described above, for example, the solenoid 390 is provided, and the pilot valve 399 attached to the solenoid 390 is also provided on the pilot channel 470, wherein the solenoid 390 is used to move the pilot valve 399 in the up-down direction to change the opening degree of the pilot valve 399 to allow adjustment of the flow resistance of the oil passing through the pilot valve 399 and thus adjustment of the back pressure in the pilot chamber 361 and the internal pressure of the pilot channel 470. That is, the solenoid 390 and the pilot valve 399 function as a control mechanism that controls the internal pressure of the pilot chamber 361 and the pilot channel 470.

During the compression side stroke, an entry amount of oil equal to the volume of the piston rod 306 entering the inner tube 301 is transferred from the rod side oil chamber S3 in the inner tube 301 to the annular oil chamber S4 via the communication hole 301a. At this time, an increase $\Delta V_1$ (supply amount) in the volume of the annular oil chamber S4 is larger than an increase $\Delta V_2$ in the volume of the piston rod 306, and thus, in the amount of oil supplied to the annular oil chamber S4, an amount of oil corresponding to insufficiency "$\Delta V_1 - \Delta V_2$" is fed from the oil storing portion Ro to the rod side oil chamber S3. The supply of the insufficient oil is performed via a supply and discharge section (not shown in the drawings) formed at the bottom portion of the partition member 307 to enable the supply and discharge of oil between the oil storage portion Ro and the rod side oil chamber S3.

(Extension Side Stroke)

Next, the operation of the second leg 10b during extension side stroke is explained with reference to FIG. 8.

During the extension side stroke where the inner tube 301 moves downward relative to the outer tube 300, the oil in the rod side oil chamber S3 is compressed by the piston 370, and pressure in the rod side oil chamber S3 is increased. Then, the oil in the rod side oil chamber S3 flows through the main channel 460 for the extension side stroke into the piston side oil chamber S2. Specifically, as depicted by solid arrows in FIG. 8, the oil flows from the rod side oil chamber S3 through the oil hole 371a in the upper piston 371 to push open the extension side inlet check valve 355 against the bias force of the plate spring 368. The oil then flows to the gap 367 and exerts pressure to push open the main valve 360 against the force generated by the plate spring 368 and the back pressure in the pilot chamber 361 and acting in the direction in which the main valve 360 is closed. The oil then passes from the gap 367 through the oil holes 359a in the main valve member 359 and the oil hole 372c in the lower piston 372 to push open the extension side outlet check valve 353 and subsequently flows into the piston side oil chamber S2. At this time, flow resistance generated when the oil passes through the main valve 360 causes exertion of an extension side damping force in the damping force variable device 350.

On the other hand, a portion of the oil having flown from the rod side oil chamber S3 through the oil hole 371a in the upper piston 371 into the gap 367 joins to the oil flowing in the main channel 460 through the pilot channel 470 and as is the case with the compression side stroke. A flow of the oil in the pilot channel 470 is depicted by dashed arrows in FIG. 8.

During the extension side stroke, an exit amount of oil equal to the volume of the piston rod 306 exiting the inner tube 301 is transferred from the annular oil chamber S4 to the rod side oil chamber S3 via the communication hole 301a. At this time, a decrease $\Delta V_3$ (discharge amount) in the volume of the annular oil chamber S4 is larger than a decrease $\Delta V_4$ in the volume of the piston rod 306, and thus, in the amount of oil discharged to the annular oil chamber S4, an amount of oil corresponding to excess "$\Delta V_3 - \Delta V_4$" is discharged from the rod side oil chamber S3 to the oil storing portion Ro. The discharge of the excess oil is performed via the supply and discharge section (not shown in the drawings) formed at the bottom portion of the partition member 307 to enable the supply and discharge of oil between the oil storing portion Ro and the rod side oil chamber S3.

As described above, the damping force variable device 350 in the second leg 10b controls the back pressure in the pilot chamber 361 to allow effective adjustment of the opening degree of the main valve 360 and thus easy adjustment to the desired damping force.

The configuration of the damping force variable device 350 is not limited to the above-described configuration. Any damping force variable device is applicable as long as the damping force variable device has a function to adjust the damping force to control the flow of the working fluid to allow the damping force to be controlled.

As described above, in the front fork 10 of the embodiment, one of the legs may be the first leg 10a internally including the stroke sensor section 100, and the other leg may be the second leg 10b including the damping force variable device 350. In this manner, the different functions are provided in the first leg 10a and the second leg 10b, respectively, to enable a configuration of one leg to be simplified.

The first leg 10a internally including the stroke sensor section 100 allows detection of the amount of change in the length of the front fork 10 with respect to the reference length of the front fork 10 and also enables prevention of external contact with the stroke sensor section 100, malicious tampering of the stroke sensor section 100, and the like.

The second leg 10b including the damping force variable device 350 controls the back pressure in the pilot chamber 361 to allow the effective adjustment of the opening degree of the main valve 360 and thus the easy adjustment to the desired damping force.

That is, the front fork 10 of the embodiment includes the pair of legs with different main functions. The front fork 10 may thus have a simplified structure, while providing a function of the front fork.

In the above-described embodiment, the present invention is applied to the inverted front fork in which the outer tube is attached to the vehicle body, whereas the inner tube is attached to the axle. However, the present invention is similarly applicable to an upright front fork in which the inner tube is attached to the vehicle body, whereas the outer tube is attached to the axle.

What is claimed is:

1. A front fork comprising:
a pair of a first leg and a second leg, wherein
the first leg internally has a stroke sensor section that detects a stroke amount of the front fork as a distance between extension and compression of the front fork,
the second leg has a damping force variable device that controls a flow of a working fluid contained in the second leg to enable a damping force to be varied,
the first leg further comprises:
    a tubular outer tube provided on an upper end side of the first leg;
    a tubular inner tube provided on a lower end side of the first leg and inserted into the outer tube, the inner tube being provided so as to be movable along a central axis of the outer tube;
    a spring collar fitted in the inner tube so as to be slidable;
    a cap provided at an upper end of the outer tube;
    a piston rod coupled to the spring collar at a lower end of the piston rod and attached to the cap at an upper end of the piston rod, the piston rod being surrounded by the stroke sensor section; and
    a spring provided so that an upper end thereof is in contact with a lower surface of the spring collar, and
the stroke sensor section comprises:
    a coil portion;
    a tubular conductor member; and
    an output wire,
the coil portion includes a coil conductor provided in an insulating member,
the conductor member has a central axis common to a central axis of the piston rod and is provided in the inner tube,
the coil portion is provided around an outer periphery of the piston rod so as to extend from the upper end toward the lower end of the piston rod,
the conductor member is provided around an outer periphery of the coil portion so as to be movable along with the inner tube in a direction along the central axis, and
the output wire is electrically connected to the coil conductor to output a signal based on an inductance of the coil conductor changing according to a length over which the coil portion and the conductor member overlap.

2. The front fork according to claim 1, wherein
the cap comprises:
    a cap main body fitted in an opening at an upper end of the outer tube;
    a central through-hole formed in the cap main body and penetrating the cap main body in a central axis direction of the outer tube; and
    a closure member that closes the central through-hole and that is formed of an insulator constituted integrally with the insulating member, and
the output wire is led to an exterior through an inside of the closure member.

3. The front fork according to claim 2, wherein
the closure member has a recess portion located in a center of a lower end side of the closure member and attached to the upper end of the piston rod,
the cap main body, the closure member, and the piston rod have respective through-holes across the cap main body, the closure member, and the piston rod in a direction perpendicular to the central axis, and
with the upper end of the piston rod being attached to the recess portion and the through-holes being aligned, a rod-like member is inserted into the through-holes to fix the piston rod to the cap main body.

4. The front fork according to claim 1, further comprising a detection section electrically connected to the output wire to receive the signal through the output wire to detect an amount of change in the inductance of the coil conductor.

5. The front fork according to claim 4, wherein
the detection section comprises:
    an oscillation circuit electrically connected to the coil conductor to oscillate at a frequency according to the change in the inductance of the coil conductor;
    a timer section that measures a waveform of oscillation of the oscillation circuit and outputs a value for a frequency according to a stroke amount resulting from extension and compression of the front fork; and
    an arithmetic section that executes a calculation based on the output for the frequency from the timer section and a predetermined table.

6. The front fork according to claim 4, wherein
the detection section is provided inside the insulating member.

7. The front fork according to claim 1, wherein
when the first leg is extended to a maximum length, at least a part of a lower end side of the coil portion is inserted into the conductor member.

8. The front fork according to claim 1, wherein the second leg comprises:
    a tubular second outer tube provided on an upper end side of the second leg;
    a tubular second inner tube provided on a lower end side of the second leg and inserted into the second outer tube, the second inner tube being provided so as to be movable along a central axis of the second outer tube and containing working fluid;
    a second piston fitted in the second inner tube so as to be slidable; and
    a second piston rod coupled to the second piston at a lower end of the second piston rod and fixed to an upper end side of the second outer tube at an upper end of the second piston rod, and
the damping force variable device comprises:
    a main channel through which the working fluid flows as a result of sliding of the second piston through the second inner tube;
    a main valve that opens and closes the main channel to control a flow of the working fluid and generate a damping force;
    a bypass channel branched from the main channel or provided in the main valve;
    a pilot chamber into which the working fluid flows via the bypass channel and in which a pressure of the working fluid causes an internal pressure to be exerted on the main valve in a direction in which the main valve is closed;
    a pilot channel through which the working fluid flows out from the pilot chamber; and
    a control mechanism that controls internal pressures of the pilot chamber and the pilot channel.

9. A front fork comprising:
a pair of a first leg and a second leg, wherein the first leg internally has a stroke sensor section that detects a stroke amount of the front fork as a distance between extension and compression of the front fork, the second leg has a damping force variable device that controls a flow of a working fluid contained in the second leg to enable a damping force to be varied, the first leg further comprises:
- a tubular outer tube provided on an upper end side of the first leg;
- a tubular inner tube provided on a lower end side of the first leg and inserted into the outer tube, the inner tube being provided so as to be movable along a central axis of the outer tube;
- a spring collar fitted in the inner tube so as to be slidable;
- a cap provided at an upper end of the outer tube;
- a piston rod coupled to the spring collar at a lower end of the piston rod and attached to the cap at an upper end of the piston rod, the piston rod being surrounded by the stroke sensor section; and
- a spring provided so that an upper end thereof is in contact with a lower surface of the spring collar, and the stroke sensor section comprises:
- a coil portion;
- a tubular conductor member; and
- an output wire, the coil portion includes a coil conductor provided in an insulating member, the conductor member has a central axis common to a central axis of the piston rod and is provided in the inner tube, the conductor member is provided around an outer periphery of the piston rod so as to be movable along with the inner tube in a direction along the central axis, the coil portion is provided around an outer periphery of the conductor member so as to extend from the upper end toward the lower end of the piston rod, and the output wire is electrically connected to the coil conductor to output a signal based on an inductance of the coil conductor changing according to a length over which the coil portion and the conductor member overlap.

10. The front fork according to claim 9, wherein when the first leg is extended to a maximum length, at least a part of a lower end side of the coil portion covers an outer periphery of the conductor member.

\* \* \* \* \*